(12) United States Patent
Mancin et al.

(10) Patent No.: US 7,950,208 B2
(45) Date of Patent: May 31, 2011

(54) SEALING JAW FOR PRODUCING SEALED PACKAGES OF A FOOD PRODUCT

(75) Inventors: Sergio Mancin, Fidenza (IT); Francesco Giordano, Bologna (IT); Ernesto Di Dodo, Keighley (GB)

(73) Assignee: Tetra Laval Holdings & Finance S.A., Pully (CH)

( * ) Notice: Subject to any disclaimer, the term of this patent is extended or adjusted under 35 U.S.C. 154(b) by 188 days.

(21) Appl. No.: 12/251,768

(22) Filed: Oct. 15, 2008

(65) Prior Publication Data

US 2009/0266030 A1 Oct. 29, 2009

(30) Foreign Application Priority Data

Apr. 29, 2008 (EP) ..................................... 08155340

(51) Int. Cl.
*B65B 9/08* (2006.01)
(52) U.S. Cl. .......... 53/551; 53/469; 53/329.2; 53/375.4; 53/376.2; 53/374.3; 156/73.5; 156/580.1
(58) Field of Classification Search .................... 53/450, 53/451, 469, 477, 551, 552, 329.2, 375.4, 53/375.9, 376.2, 374.3, 374.5, 374.6; 156/73.5, 156/73.1, 580.1, 580.2; 425/174.2; 264/442, 264/443, 445
See application file for complete search history.

(56) References Cited

U.S. PATENT DOCUMENTS

| | | | | |
|---|---|---|---|---|
| 3,574,039 A | * | 4/1971 | Fehr et al. | 156/515 |
| 4,630,429 A | * | 12/1986 | Christine | 53/479 |
| 6,019,154 A | * | 2/2000 | Ma et al. | 156/580 |
| 6,110,089 A | * | 8/2000 | Hatozaki et al. | 493/189 |
| 6,739,370 B2 | * | 5/2004 | Melheim | 156/581 |
| 7,617,658 B2 | * | 11/2009 | Nemkov et al. | 53/551 |
| 2007/0199652 A1 | * | 8/2007 | Gustafsson | 156/304.1 |
| 2008/0105385 A1 | | 5/2008 | Wild et al. | |

FOREIGN PATENT DOCUMENTS

| | | |
|---|---|---|
| EP | 0 615 907 B1 | 9/1994 |
| EP | 0 887 265 B1 | 12/1998 |
| EP | 1 854 618 A1 | 11/2007 |
| FR | 2 829 962 A1 | 3/2003 |
| WO | WO 98/57798 A1 | 12/1998 |
| WO | WO 2006/041380 A1 | 4/2006 |

OTHER PUBLICATIONS

European Search Report issued in priority EP Patent Application No. 08155340.6, Sep. 26, 2008, EPO, Munich, DE.

* cited by examiner

*Primary Examiner* — Hemant M Desai
(74) *Attorney, Agent, or Firm* — Buchanan Ingersoll & Rooney PC

(57) ABSTRACT

A sealing jaw for producing sealed packages of a food product from a tube of packaging material includes a supporting body, and a first work surface which interacts, in use, with a second work surface on a further jaw to grip the material to be sealed and perform a sealing operation; one of the jaws defines an anvil, and the other of the jaws defines heating means; the jaw has connecting means for connecting the first surface to the supporting body; the connecting means define a curved third and a curved fourth surface made of rigid material and cooperating mutually to allow the first surface to oscillate with respect to the supporting body when gripping the packaging material prior to the sealing operation.

20 Claims, 4 Drawing Sheets

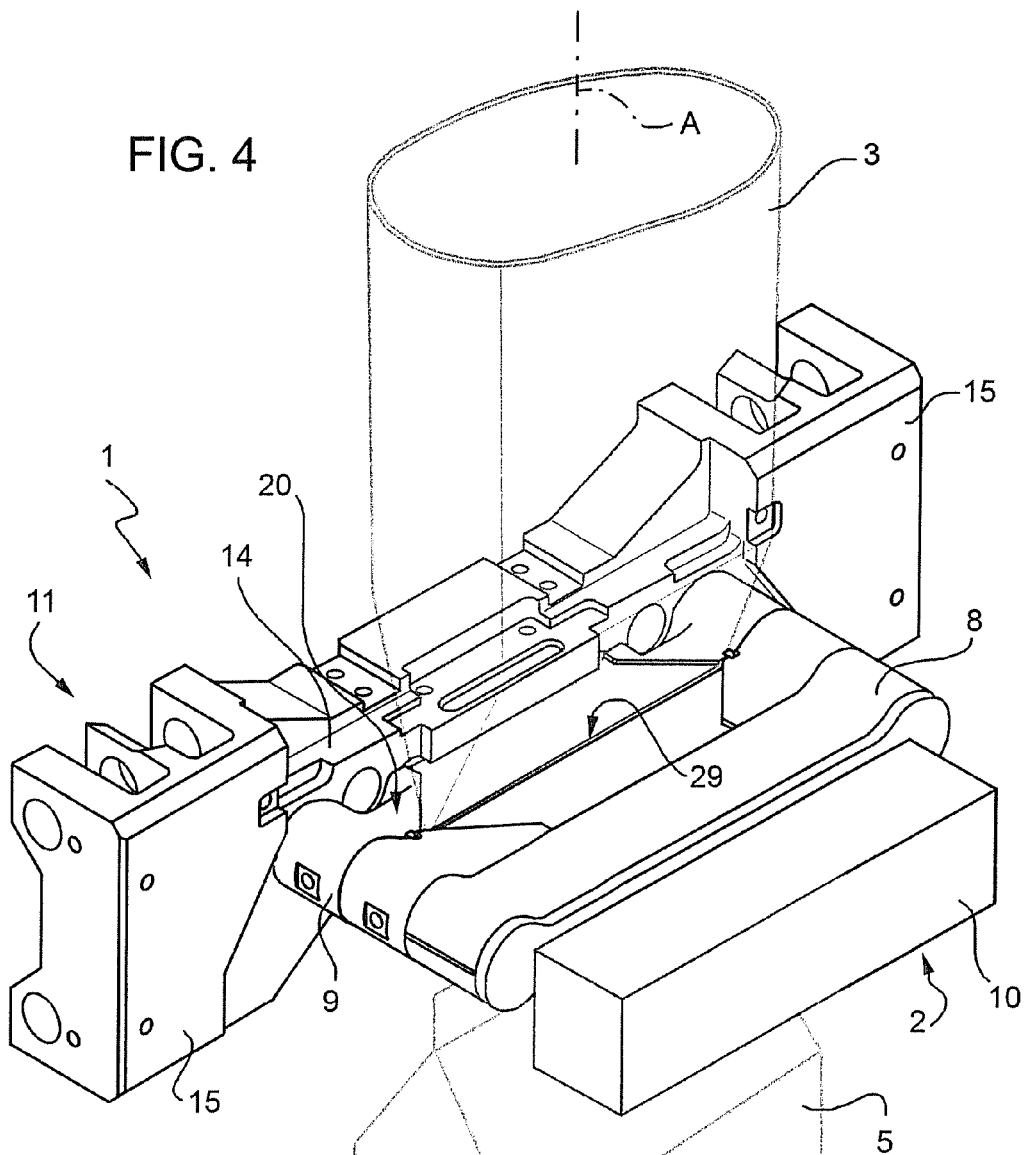
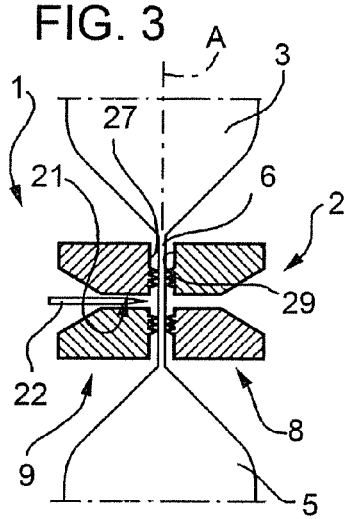

SEALING JAW FOR PRODUCING SEALED PACKAGES OF A FOOD PRODUCT

FIELD OF THE INVENTION

The present invention relates to a sealing jaw for producing sealed packages of a food product.

BACKGROUND DISCUSSION

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material. More specifically, the web of packaging material is unwound off a reel and fed through an aseptic chamber on the packaging machine, where it is sterilized, e.g. by applying a sterilizing agent such as hydrogen peroxide, which is subsequently evaporated by heating, and/or by subjecting the packaging material to radiation of appropriate wavelength and intensity; and the sterilized web is maintained in a closed, sterile environment, and is folded into a cylinder and sealed longitudinally to form a continuous tube in known manner.

The tube of packaging material, which in effect forms an extension of the aseptic chamber, is fed in a vertical direction, is filled with the sterilized or sterile-processed food product, and is fed through a sealing device to form the individual packages. More specifically, in the sealing device, the tube is sealed at a number of equally spaced cross sections to form pillow packs connected to one another by transverse sealing strips, i.e. extending perpendicularly to the travelling direction of the tube; and the pillow packs are separated from one another by cutting the relative transverse sealing strips, and are conveyed to a folding station where they are folded mechanically to form respective finished parallelepiped-shaped packages.

Packaging machines are known, as described for example in European Patent EP-B-0887265, which comprise two chain conveyors defining respective endless paths and fitted with respective numbers of sealing jaws. The two paths have respective branches substantially facing and parallel to each other, and between which the tube of packaging material is fed so that the jaws on one conveyor cooperate with corresponding jaws on the other conveyor along said branches of the respective paths, to grip the tube at a number of successive cross sections, and to seal and cut the packs.

Packaging machines are also known comprising only two pairs of jaws, which act alternately on the tube of packaging material to grip and seal, e.g. heat seal, it along a number of equally spaced cross sections.

Once the sealing operation is completed, a cutter, carried, for example, by one of the jaws in each pair, is activated, and interacts with the tube of packaging material to cut it along a centre line of the cross section just sealed, and so detach a pillow pack from the bottom end of the tube of packaging material. The bottom end being sealed transversely, the relative jaws, on reaching the bottom dead-centre position, can be opened to avoid interfering with the top portion of the tube. At the same time, the other pair of jaws, operated in exactly the same way, moves down from the top dead-centre position, and repeats the above grip/form, seal and cut process.

In both types of packaging machines, the tube portion gripped between each pair of jaws is normally sealed by heating means carried on one of the jaws and which locally melt the layers of heat-seal plastic material gripped between the jaws.

Ultrasound sealing devices are now widely used to locally melt the packaging material faster and so increase output.

Ultrasound sealing devices substantially comprise a mechanical-vibration generator, or sonotrode, and an anvil—as described, for example, in EP-B-615907—which are fitted to respective jaws in each pair, and have respective surfaces which cooperate with each other to heat the packaging material by ultrasound vibration.

More specifically, a sonotrode is a sealing tool which is vibrated by one or more disks of piezoelectric material; the disks are supplied with alternating voltage, and generate mechanical vibration of an energy depending on the actual supply voltage or electric current supply.

A need is felt within the industry to achieve, at the packaging material gripping stage preceding the sealing stage, as controlled and repeatable an oscillating movement as possible of the anvil surface with respect to a supporting body on the relative jaw, so as to position the anvil parallel to the sonotrode.

More specifically, a need is felt to achieve the above oscillating movement without impairing the end quality of the seal, i.e. without forming unsealed strips of packaging material within the sealing strips.

A need is also felt within the industry to control as accurately as possible the gripping force between the sonotrode and anvil surfaces at the sealing stage, so as to enable electric power supply by the voltage generator in as predetermined a manner as possible, and so reduce the time taken to form the sealing strips.

More specifically, a need is felt to keep the variation in the actual gripping force, with respect to a predetermined grip-time pattern, within a narrow tolerance range, e.g. of more or less 25 newtons.

It is an object of the present invention to provide a sealing jaw designed to meet at least one of the above requirements in a simple, low-cost manner.

SUMMARY

According to the present invention, there is provided a sealing jaw for producing sealed packages of food products.

A preferred, non-limiting embodiment of the present invention will be described by way of example with reference to the accompanying drawings, in which:

BRIEF DESCRIPTION OF THE DRAWING FIGURES

FIG. 3 shows a schematic, partly sectioned side view, with parts removed for clarity, of the FIGS. 1 and 2 jaw and a corresponding counter-jaw, with a sonotrode, in a closed position;

FIG. 4 shows a much larger-scale view in perspective of the FIG. 3 jaw and counter-jaw;

DETAILED DESCRIPTION

Figure 1:
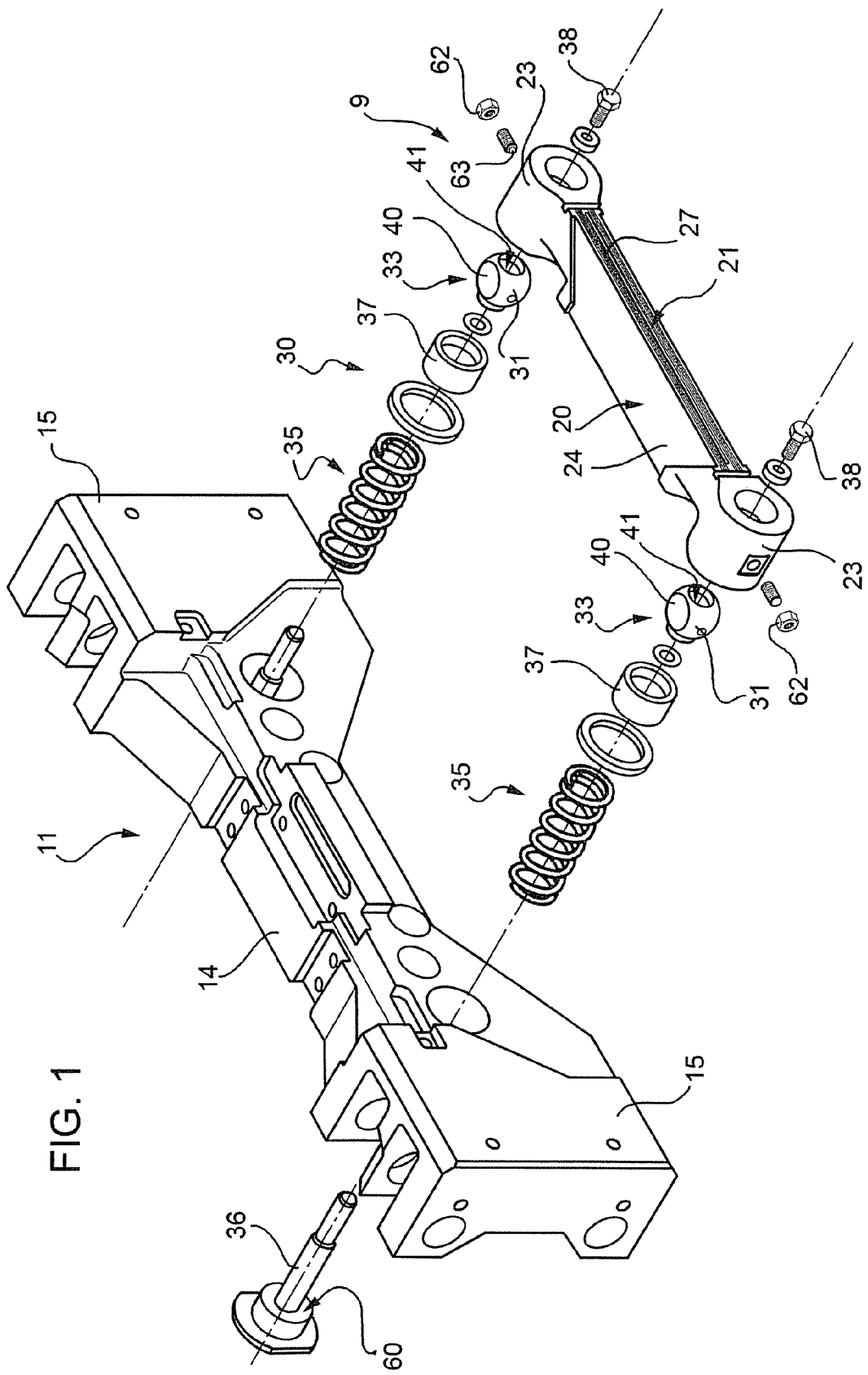
FIG. 1 shows an exploded view in perspective of a jaw in accordance with the present invention.
Figure 2:
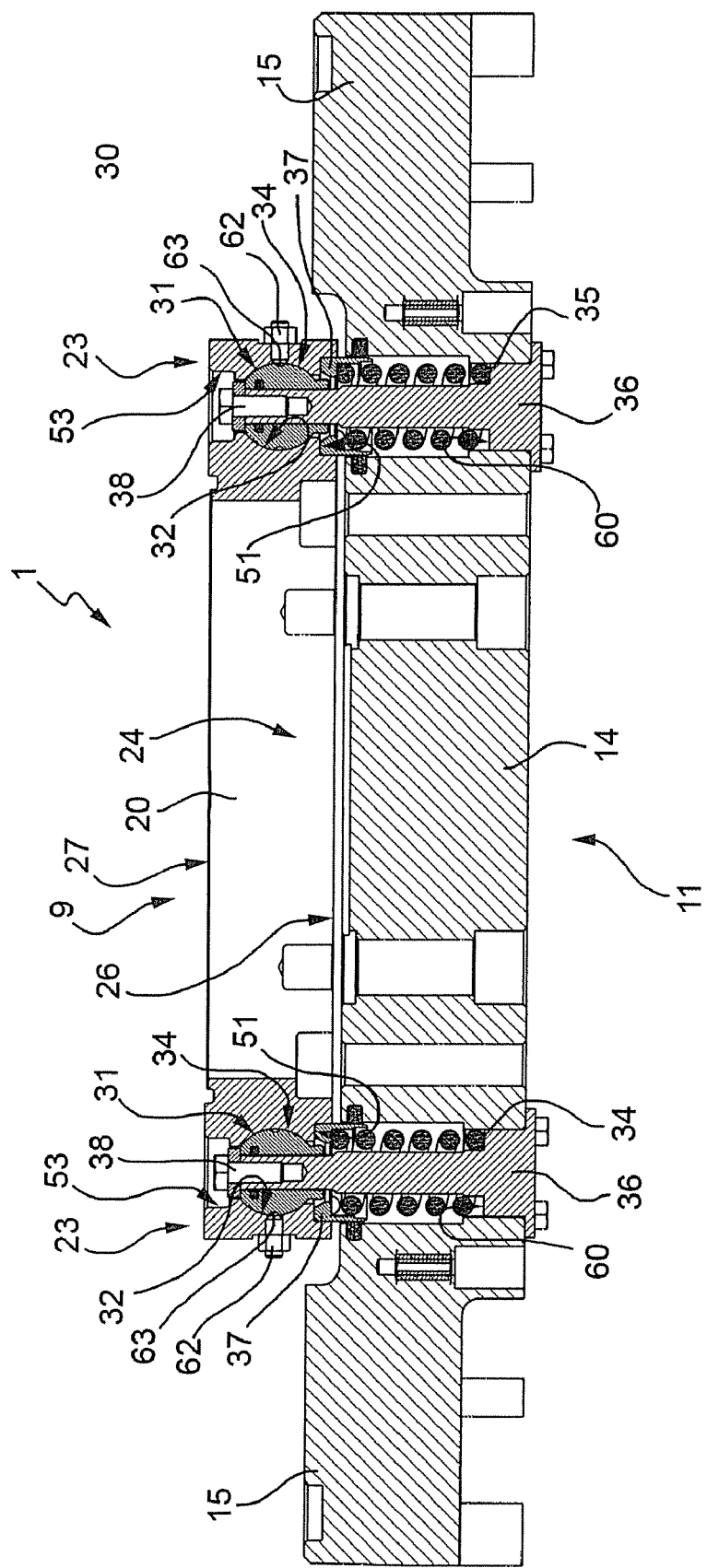
FIG. 2 shows a section of the FIG. 1 jaw.

With reference to FIGS. 1 to 4, number 1 indicates as a whole a jaw in accordance with the present invention, for producing sealed packages of a food product.

Jaw 1 can be incorporated in a packaging machine (not shown) for producing sealed packages of a food product from a tube 3 of packaging material fed by known devices (not shown) along a vertical path A.

Jaw 1 is preferably incorporated in a packaging machine for producing sealed packages of a pourable food product, such as pasteurized or UHT milk, fruit juice, wine, peas, beans, etc.

Jaw 1 may also be incorporated in a packaging machine for producing sealed packages of a food product that is pourable at the package manufacturing stage, and sets after the package is sealed. One example of such a food product is a portion of cheese, that is melted at the package manufacturing stage, and sets after the package is sealed.

Tube 3 is formed in known manner by longitudinally folding and sealing a web of heat-seal sheet material, and is filled continuously downwards with the sterilized or sterile-processed food product for packaging.

The packaging machine comprises two chain conveyors, of the type illustrated and described in Patent EP-B-0887265, which define respective endless paths and are fitted with respective numbers of sealing jaws 1 and respective counter-jaws 2 (FIGS. 3, 4). The paths have respective branches substantially parallel to each other and between which tube 3 is fed along path A, so that, along said branches of the respective paths, jaws 1 on one conveyor cooperate with corresponding counter-jaws 2 on the other conveyor to grip, ultrasound-seal, and cut tube 3 at a number of equally spaced cross sections.

More specifically, jaw 1 and counter-jaw 2 in each pair interact with tube 3 to seal it at a number of equally spaced cross sections and form pillow packs 5 connected to tube 3 by respective sealing strips 6 perpendicular to path A.

Strips 6 are cut by a cutter 22 on jaw 1 to detach each pack 5 from tube 3.

Each counter-jaw 2 and corresponding jaw 1 are located on opposite sides of tube 3, are fitted respectively with a mechanical-vibration generator or sonotrode 8 and an anvil 9, and are movable, crosswise to path A, between an open position and a closed position (shown in FIGS. 3 and 4), in which they grip and seal tube 3 at a relative cross section to form a relative sealing strip 6.

Sonotrode 8, only shown schematically in FIGS. 3 and 4, preferably comprises a number of side by side ultrasound heads of the type illustrated and described in Patent EP-B-615907, and housed in an outer casing 10 fitted rigidly to the body of counter-jaw 2.

Very briefly, sonotrode 8 is a sealing tool vibrated by one or more disks of piezoelectric material; the disks are supplied with alternating voltage, and generate mechanical vibration of an energy depending on the actual supply voltage.

Each jaw 1 substantially comprises anvil 9; and a supporting body 11 supporting anvil 9.

Supporting body 11 (FIG. 2) is substantially flat, and comprises a central portion 14 and two end portions 15.

With reference to the closed position of jaws 1 and corresponding counter-jaws 2, supporting body 11 lies in a plane parallel to path A, and end portions 15 are larger than central portion 14 in a direction parallel to path A.

Anvil 9 substantially comprises a substantially prismatic main body 20 defining a through seat 21 (FIGS. 1, 3, 5, 6) housing cutter 22 (FIG. 3); and two end portions 23 in the form of respective hollow cylinders and located at opposite ends of main body 20.

More specifically, main body 20 comprises:
two, respectively top and bottom, surfaces 24, 25 lying in respective parallel planes perpendicular to path A, when jaw 1 and corresponding counter-jaw 2 are in the closed position;
a front surface 27 interposed perpendicularly between surfaces 24 and 25, and through which seat 21 is formed; and
a further surface 26 (FIGS. 5, 6) interposed perpendicularly between surfaces 24 and 25, located on the opposite side to surface 27, and through which seat 21 is also formed.

More specifically, seat 21 lies in a central plane parallel to surfaces 24 and 25.

Cutter 22 is housed in sliding manner inside seat 21, and is controlled by a known actuating device (not shown) to cut tube 3 at transverse strips 6 to detach pack 5 from tube 3.

When jaw 1 and corresponding counter-jaw 2 are in the closed position (FIGS. 3, 4), surface 27 and a corresponding surface 29 of sonotrode 8 grip and seal tube 3 to form relative sealing strip 6.

Jaw 1 advantageously comprises connecting means 30 (FIGS. 1, 2) for connecting anvil 9 to supporting body 11. Connecting means 30 comprise two pairs of curved surfaces 31, 32 made of rigid material and cooperating with each other to enable surface 27 to oscillate with respect to supporting body 11 at the packaging material gripping stage preceding formation of strip 6.

It is important to note that the term "rigid material" in the present description is intended to mean a material that is macroscopically undeformable under stress. Examples of rigid materials, as understood in the present description, are metal, ceramic, or polymer materials.

An elastically deformable material, in particular rubber, on the other hand, does not constitute a rigid material as understood in the present description.

More specifically, connecting means 30 substantially comprise:
two pivots 33 having respective through holes, and each defining a respective pair of surfaces 31;
two seats 34 defined by respective end portions 23 of anvil 9, engaged by respective pivots 33, and each defining a pair of surfaces 32 cooperating with respective surfaces 31 of a relative pivot 33; and
two pins 36 fitted through respective pivots 33 and each having a first end fixed to supporting body 11, and a second end connected to a screw 38 fixed inside a respective end portion 23.

Pivots 33 and respective seats 34 define two articulated joints, which allow surface 27 to oscillate with respect to supporting body 11 in two perpendicular directions defining a plane at the tube 3 gripping stage preceding formation of strip 6. The articulated joints therefore allow surface 27 to remain parallel to surface 29 of sonotrode 8 when forming strip 6.

Each pivot 33 comprises a main portion in the form of the solid obtained by cutting a sphere in a first pair of parallel planes and in a second pair of parallel planes perpendicular to the first planes; and a cylindrical end portion projecting towards supporting body 11 from the main portion.

The surface of the main portion of each pivot 33 therefore comprises:
two parallel flat faces 40 (only one shown in FIG. 1);
two parallel flat openings 41 fitted through with a respective pin 36 and lying in respective planes perpendicular to faces 40; and
two opposite surfaces 31 in the form of respective concentric spherical surface portions.

More specifically, each surface 31 is interposed between faces 40, and between openings 41 which are circular.

Each end portion 23 defines a through cavity (FIGS. 5, 6) substantially comprising, from surface 26 to surface 27:
a shoulder 51 having a circular section in a plane parallel to surfaces 26, 27;
seat 34 housing pivot 33 and defining a respective pair of surfaces 32; and
a cylindrical recess 53 (FIG. 2) having an axis perpendicular to surfaces 26, 27, and housing a respective screw 38.

Figure 5:
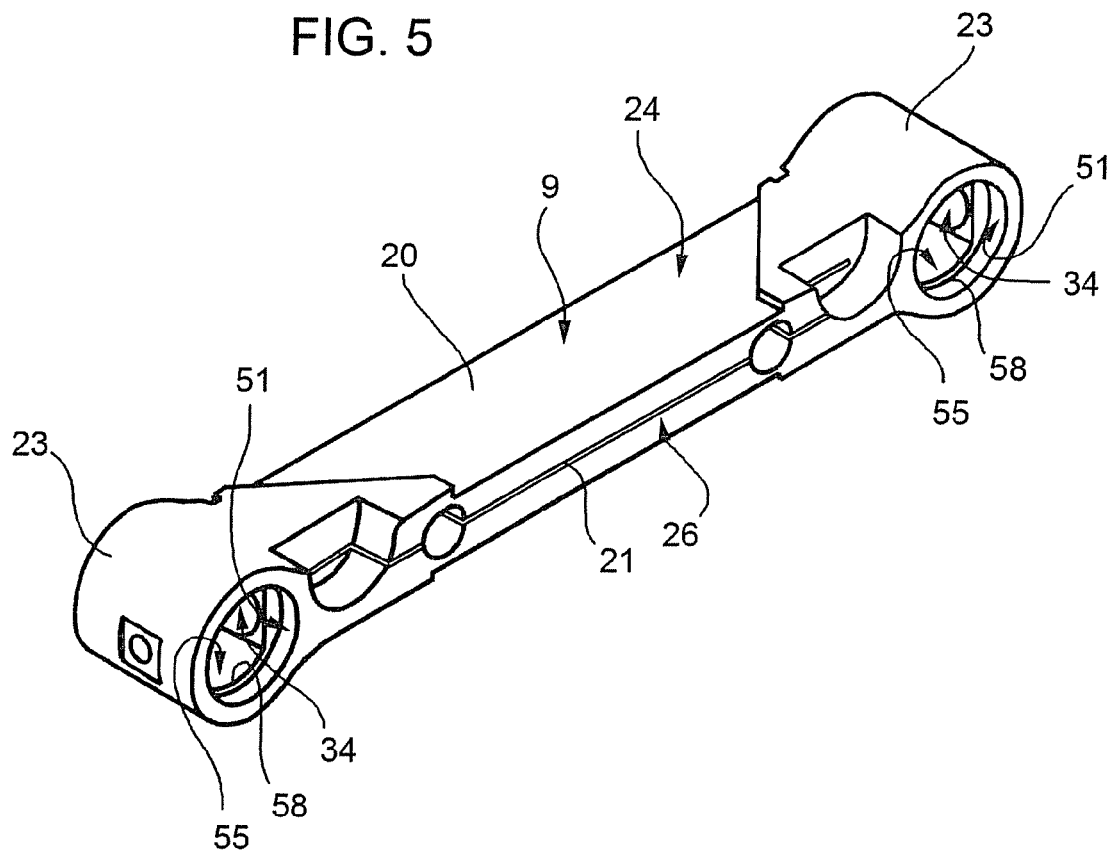
FIGS. 5 and 6 show views in perspective, from different angles, of a detail of the FIGS. 1 and 2 jaw.
Figure 6:
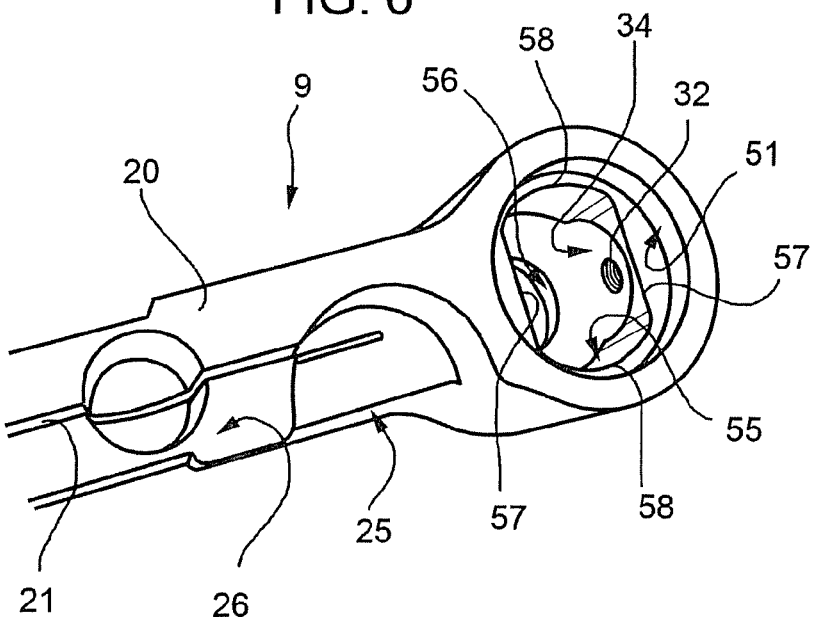

Each seat 34 is bounded on the supporting body 11 side by an opening 55; and a hole 56 is interposed between each seat 34 and relative recess 53 (FIGS. 5, 6).

More specifically, each opening 55 is bounded by two parallel segments 57 perpendicular to surfaces 24 and 25, and by two concentric arcs 58, each interposed between one end of one segment 57 and a corresponding end of the other segment 57.

The diameter of the imaginary circle defining arcs 58 equals the diameter of the imaginary sphere defining surfaces 31 of relative pivot 33, and is longer than the distance between segments 57.

Each seat 34 is also bounded laterally by a first and second surface 32 facing and opposite each other. More specifically, surfaces 32 of each seat 34 are in the form of concentric spherical surface portions.

More specifically, the imaginary sphere defining surfaces 32 of each seat 34 has a diameter equal to the imaginary diameter of the imaginary sphere defining surfaces 31 of relative pivot 33.

Each pivot 33 can therefore be fitted through respective opening 55, with surfaces 31 located at arcs 58 of opening 55, and with faces 40 located at segments 57 of opening 55, and can then be rotated ninety degrees about its axis inside respective seat 34, so that surfaces 31 rest against respective surfaces 32 of seat 34. More specifically, when each pivot 33 is housed inside respective seat 34, hole 56 is coaxial with the opening 41 of pivot 33 on the opposite side to supporting body 11.

Pivots 33 and seats 34 are made of rigid material, e.g. metal, polymer material, or ceramic, to ensure respective surfaces 31, 32 perform rigidly when jaws 1 and corresponding counter-jaws 2 cooperate to form strips 6.

Surfaces 31, 32 may also be coated with respective friction-reducing materials, such as Teflon.

Connecting means 30 also comprise:
two sleeves 37, each having a main portion housed inside relative shoulder 51, and a cylindrical wall projecting from the main portion towards supporting body 11; and
two coil springs 35 coaxial with respective pins 36, and each having a first end fixed to a shoulder 60 of respective pin 36, and a second end opposite the first end and fixed to the main portion of relative sleeve 37. When jaw 1 and corresponding counter-jaw 2 are in the closed position, springs 35 are compressed and exert on anvil 9 an equal, opposite reaction to the gripping force of jaw 1 and counter-jaw 2.

Pins 36 extend along respective axes perpendicular to surfaces 26, 27.

From the first to the second end, each pin 36 defines shoulder 60, extends coaxially through respective spring 35, respective sleeve 37, and respective pivot 33, and is fixed to respective screw 38.

Each pivot 33 is held in position inside relative seat 34 by a respective pin 62 fitted through a lateral wall of relative end portion 23.

More specifically, each lateral wall defines relative end portion 23 on the opposite side to main portion 20.

Each pin 62 extends along an axis perpendicular to the axes of springs 35, and has a rounded end 63 (FIG. 2) cooperating with a cavity 64, of the same shape as end 63, in surface 32, so that adjusting the position of pins 62 adjusts the oscillating freedom of pivots 33 inside respective seats 34, and therefore of anvil 9 with respect to supporting body 11.

Anvil 9 also comprises two sealing rings surrounding respective pins 36 and adjacent to the second ends of pins 36; and two seals surrounding the cylindrical walls of respective sleeves 37.

Jaw 1 operates as follows.

The two chain conveyors are rotated in opposite directions so that jaws 1 and corresponding counter-jaws 2 cooperate with tube 3 with a predetermined law of motion.

The operating cycle will now be described in more detail with reference to one jaw 1 and a corresponding counter-jaw 2, all the jaws 1 and corresponding counter-jaws 2 obviously performing the same cycle at time intervals depending on the output rate.

Along given portions of said paths, jaw 1 and corresponding counter-jaw 2 are brought together from the open position to gradually deform and eventually "flatten" tube 3 to form a transverse band of tube 3.

On reaching the closed position, jaw 1 and corresponding counter-jaw 2 grip tube 3, and sonotrode 8 is activated to locally heat and melt the packaging material and so form strip 6.

At the gripping stage prior to forming the seal, the articulated joints defined by pivots 33 and respective seats 34 allow surface 27 of anvil 9 to oscillate with respect to supporting body 11 and so position itself parallel to surface 29 of sonotrode 8.

Moreover, when forming the seal, springs 35 are compressed and react to the force gripping counter-jaw 2 to anvil 9.

Once strip 6 is formed, cutter 22 is activated to cut tube 3 along a plane of strip 6 and so detach the formed pack 5 from the rest of tube 3.

Jaw 1 and corresponding counter-jaw 2 are then moved into the open position, away from path A, to release tube 3.

The advantages of jaw 1 according to the present invention will be clear from the above description.

In particular, the articulated joints defined by surfaces 31, 32 of pivots 33 and respective seats 34 allow anvil 9 of jaw 1 two degrees of freedom, and allow it to oscillate in a plane with respect to supporting body 11 at the gripping stage preceding the formation of strip 6.

When jaw 1 and corresponding counter-jaw 2 are gripped about tube 3, surface 27 of anvil 9 can therefore position itself parallel to surface 29 of sonotrode 8 contacting surface 27.

More specifically, the Applicant has observed that the articulated joints defined by pivots 33 and respective seats 34 provide for obtaining geometric parallelism tolerances of roughly 0.05 mm, i.e. keep all the points on surface 27 at a distance of less than 0.05 mm from an imaginary plane parallel to surface 29.

As a result, even in the event of slight variations in the speed at which counter-jaws 2 impact respective jaws 1, and in the approach conditions of jaws 1 and corresponding counter-jaws 2, sealing strips 6 have no unsealed portions of packaging material.

Moreover, surfaces 31, 32 of pivots 33 and seats 34 being rigid and therefore undeformable, the gripping force of jaws 1 and counter-jaws 2 is balanced by connecting means 30 exclusively by compression of springs 35.

The rigidity of springs 35 being a substantially constant quantity, the gripping force of each jaw 1 and corresponding counter-jaw 2 varies little, e.g. by about more or less 25 newtons, with respect to a given grip-time pattern.

As a result, rapidly, unpredictably varying power supply by the voltage generator is not required, thus reducing the time taken to form the seal.

Clearly, changes may be made to jaw 1 as described and illustrated herein without, however, departing from the protective scope defined in the accompanying Claims.

In particular, as opposed to being interposed between anvil 9 and supporting body 11, connecting means may be interposed between sonotrode 8 and a respective supporting body on casing 10 of counter-jaw 2.

The packaging machine may have no chain conveyors, and comprise two pairs of jaws 1 and counter-jaws 2, which act alternately on tube 3, are each movable along respective guides between a closed position and an open position, and interact cyclically and successively with the tube to heat seal the packaging material of the tube.

Instead of sonotrode 8, counter-jaw 2 may be fitted with a sealing device with different heating means, e.g. induction heating means or means comprising a heated bar.

Finally, jaw 1 may have no pins 62, and the seals interposed between sleeves 37 and respective pivots 33 may have respective teeth engaging respective grooves on the cylindrical end portions of relative pivots 33.

The invention claimed is:

1. A sealing jaw for producing sealed packages of a food product from a tube of packaging material, and comprising:
   first jaw and second jaw;
   said first jaw comprising a main body and a supporting body, and said main body comprising a first work surface and first and second cavities;
   said second jaw comprising a second work surface, said first and second work surfaces interacting with one another to grip and perform a sealing operation on said packaging material, one of said jaws defining an anvil, and the other of said jaws defining heating means which interact with said anvil to form a sealing strip;
   connecting means for connecting said first surface to said supporting body; and
   said connecting means comprising a pair of spaced apart pivots each positioned in said respective cavity in the main body, each pivot possessing a curved third outer surface made of rigid material and each said cavity possessing a curved fourth surface made of rigid material, and each of the third curved surfaces cooperating mutually with a respective one of the fourth curved surfaces to allow said first surface to oscillate with respect to said supporting body when gripping said packaging material prior to performing said sealing operation.

2. A jaw as claimed in claim 1, said anvil defines said first surface; said further jaw comprising said heating means.

3. A jaw as claimed in claim 2, wherein said third and said fourth surface are at least partly spherical.

4. A jaw as claimed in claim 2, wherein each of said third curved surfaces and the respective one of said fourth curved surfaces define an articulated joint allowing said anvil to oscillate in one plane with respect to said supporting body.

5. A jaw as claimed in claim 1, wherein each of said fourth curved surfaces is a seat engaged by said respective pivot.

6. A jaw as claimed in claim 5, wherein each of said seats is located inside said main body in spaced apart relation to one another.

7. A jaw as claimed in claim 6, comprising a first adjusting pin passing through a through hole in the main body and contacting the first pivot to fix a position of the first pivot in the first seat, the first pin being moved out of contact with the first pivot to permit adjustment of the position of the first pivot in the first seat.

8. A jaw as claimed in claim 5, comprising adjusting means for adjusting a position of said pivots inside said respective seat.

9. A jaw as claimed in claim 1, wherein said connecting means comprise two pins, each pin passing through a respective through hole in said supporting body and each pin fixed to a respective one of the pivots.

10. A jaw as claimed in claim 9, comprising elastic means interposed between each pin and said main body for acting on said main body to elastically urge said main body away from said supporting body.

11. A jaw as claimed in claim 10, wherein each pin comprises a first end and a second end opposite each other, the first end of each pin being fixed to the respective pivot, the second end of each pin contacting the supporting body; said elastic means comprising two springs, each spring encircling a respective one of the pins, said first end and said second end of said spring being located between said first end and said second end of said pin.

12. A jaw as claimed in claim 1, wherein at least one of said third and said fourth surfaces is made of metal, polymer material, or ceramic.

13. A jaw as claimed in claim 12, wherein at least one of said third and said fourth surfaces is coated with friction-reducing material.

14. A packaging machine for producing sealed packages of a food product from a tube of packaging material fed along a vertical path, filled continuously with said food product, and gripped at equally spaced cross sections; said machine comprising a sealing jaw and a further jaw, which cooperate mutually to seal the packaging material of said tube along said cross sections, the sealing jaw comprising:
   first jaw and second jaw;
   said first jaw comprising a main body and a supporting body, and said main body comprising a first work surface and first and second cavities;
   said second jaw comprising a second work surface, said first and second work surfaces interacting with one another to grip and perform a sealing operation on said packaging material, one of said jaws defining an anvil, and the other of said jaws defining heating means which interact with said anvil to form a sealing strip;
   connecting means for connecting said first surface to said supporting body; and
   said connecting means comprising a pair of spaced apart pivots each positioned in said respective cavity in the main body, each pivot possessing a curved third outer surface made of rigid material and each said cavity possessing a curved fourth surface made of rigid material, and each of the third curved surfaces cooperating mutually with a respective one of the fourth curved surfaces to allow said first surface to oscillate with respect to said supporting body when gripping said packaging material prior to performing said sealing operation.

15. A packaging machine for producing sealed packages of a food product from a tube of packaging material fed along a vertical path, filled continuously with said food product, and gripped at equally spaced regions, the packaging machine comprising:

first jaw and second jaw;

first pivot and second pivot, said each first and second pivot comprising a hole;

first pin and second pin;

the first jaw comprising a supporting body and a main body separate from the supporting body, the main body comprising a first surface and first and second seats and the supporting body comprising first and second holes;

the second jaw comprising a second surface;

the first surface and the second surface interacting with one another to grip the tube of packaging material and perform a sealing operation on the tube of packaging material at the regions;

one of the first and second jaws comprising an anvil, and the other of the first and second jaws comprising heating means which interact with the anvil to form a sealing strip on the tube of packaging material;

the first and second seats in the main body, each of the first and second seats being made of a rigid material and comprising a curved surface;

the first pivot mounted in the first seat and possessing an outer surface that includes a curved outer surface portion made of rigid material;

the second pivot mounted in the second seat and possessing an outer surface that includes a curved outer surface portion made of rigid material;

the curved outer surface portion of the first pivot contacting the curved surface of the first seat;

the curved outer surface portion of the second pivot contacting the curved surface of the second seat;

the first pin positioned in the first hole in the supporting body and in the hole in the first pivot to connect together the supporting body and the main body; and the second pin positioned in the second hole in the supporting body and in the hole in the second pivot to connect together the supporting body and the main body.

16. A packaging machine as claimed in claim 15, wherein the outer surface of the first pivot includes two spaced apart flat surface portions, the first pivot also including a through hole having opposite open ends opening to the outer surface of the first pivot at positions spaced from the flat surface portions, and wherein the outer surface of the second pivot includes two spaced apart flat surface portions, the second pivot also including a through hole having opposite open ends opening to the outer surface of the second pivot at positions spaced from the flat surface portions of the second pivot.

17. A packaging machine as claimed in claim 16, wherein the two flat surface portions of the first pivot are parallel to each other, and wherein the two flat surface portions of the second pivot are parallel to each other.

18. A packaging machine as claimed in claim 15, wherein the first seat is bounded on a side toward the supporting body by a first opening formed in the main body, wherein the first opening possesses a shape that includes two straight segments parallel to one another and two concentric arcs spaced apart from each other by the straight segments, wherein the second seat is bounded on a side toward the supporting body by a second opening formed in the main body, wherein the second opening possesses a shape that includes two straight segments parallel to one another and two concentric arcs spaced apart from each other by the straight segments of the second opening.

19. A packaging machine as claimed in claim 15, wherein the first hole in the supporting body and the hole in the first pivot are through holes, and one end of the first pin engages the supporting body and an opposite end of the first pin threadably engages a first screw at least partially positioned in the through hole in the first pivot, and wherein the second hole in the supporting body and the hole in the second pivot are through holes, and one end of the second pin engages the supporting body and an opposite end of the second pin threadably engages a second screw at least partially positioned in the through hole in the second pivot.

20. A packaging machine as claimed in claim 15, further comprising a first spring applying an urging force to the first pin urging the first pin in a direction away from the main body, and a second spring applying an urging force to the second pin urging the second pin in a direction away from the main body.

* * * * *